US012696275B2

(12) United States Patent
Ryu et al.

(10) Patent No.: US 12,696,275 B2
(45) Date of Patent: Jul. 28, 2026

(54) PSCCH AND PSSCH TRANSMISSION ON CONTIGUOUS RB SETS IN SL-U

(71) Applicant: QUALCOMM Incorporated, San Diego, CA (US)

(72) Inventors: Jae Ho Ryu, San Diego, CA (US); Chih-Hao Liu, San Diego, CA (US); Sanghoon Kim, San Jose, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 867 days.

(21) Appl. No.: 17/937,378

(22) Filed: Sep. 30, 2022

(65) Prior Publication Data

US 2024/0114510 A1 Apr. 4, 2024

(51) Int. Cl.
| | |
|---|---|
| *H04W 72/20* | (2023.01) |
| *H04W 16/14* | (2009.01) |
| *H04W 72/0453* | (2023.01) |
| *H04W 74/0808* | (2024.01) |

(52) U.S. Cl.
CPC ........... *H04W 72/20* (2023.01); *H04W 16/14* (2013.01); *H04W 72/0453* (2013.01); *H04W 74/0808* (2013.01)

(58) Field of Classification Search
None
See application file for complete search history.

(56) References Cited

U.S. PATENT DOCUMENTS

| | | | | |
|---|---|---|---|---|
| 2021/0297221 | A1* | 9/2021 | Lee | H04L 1/1812 |
| 2022/0124701 | A1* | 4/2022 | Yang | H04L 5/00 |
| 2024/0007237 | A1* | 1/2024 | Cheng | H04L 5/0041 |
| 2024/0049262 | A1* | 2/2024 | Hui | H04W 72/02 |
| 2024/0098791 | A1* | 3/2024 | Cheng | H04W 76/28 |
| 2025/0227722 | A1* | 7/2025 | Park | H04W 72/25 |

* cited by examiner

*Primary Examiner* — Srinivasa R Reddivalam
(74) *Attorney, Agent, or Firm* — ArentFox Schiff LLP

(57) ABSTRACT

The present disclosure provides solutions to sidelink transmission/reception problems by preparing waveforms for multiple resource blocks (RBs) in a given bandwidth. Upon determining the availability of RBs or sets of RBs the apparatuses and methods of the present disclosure allow for dynamic determination and use of available sidelink frequencies. An apparatus may comprise a memory and at least one processor coupled to the memory and configured to transmit and/or receive sidelink data in at least one contiguous set of RBs within a bandwidth part (BWP) of an unlicensed frequency band, the BWP including a plurality of RB sets, wherein the SL data is transmitted and/or received in a waveform generated for at least one of the plurality of RB sets prior to a listen-before-talk procedure indicating an availability of the at least one contiguous set of RBs for transmission.

30 Claims, 12 Drawing Sheets

1000

Transmit SL data in at least one contiguous set of RBs within a BWP of an unlicensed frequency band, the BWP including a plurality of RB sets, where the SL data is transmitted in a waveform generated for at least one of the plurality of RB sets prior to a LBT procedure indicating an availability of the at least one contiguous set of RBs for transmission of the SL data 1002

Transmit a PSCCH in an initial RB set of the multiple, contiguous sets of RBs 1004

Transmit an interlaced PSCCH in the at least one contiguous set of RBs, wherein an interlace of the interlaced PSCCH is relative to an initial RB of the at least one contiguous set of RBs 1006

Transmit and/or receive SL data in at least one contiguous set of RBs within a BWP of an unlicensed frequency band

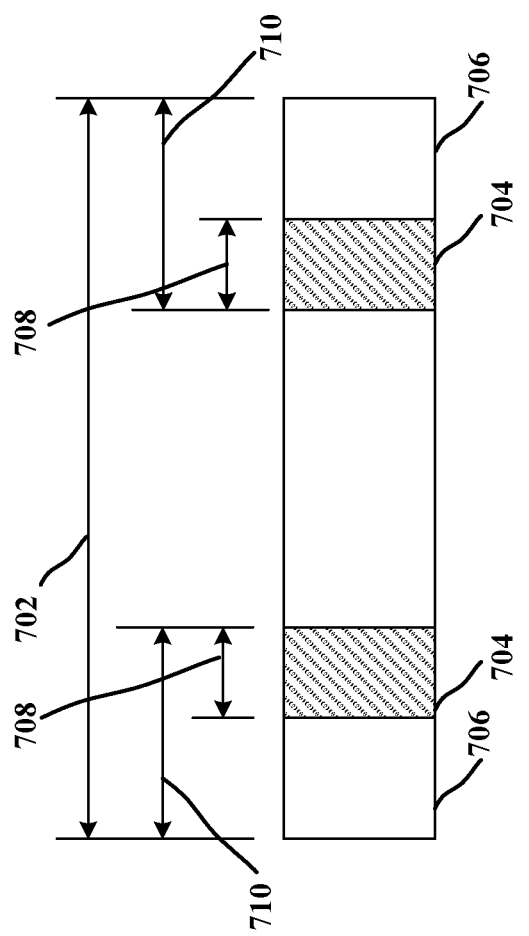
: Sensing
Period
FIG. 7

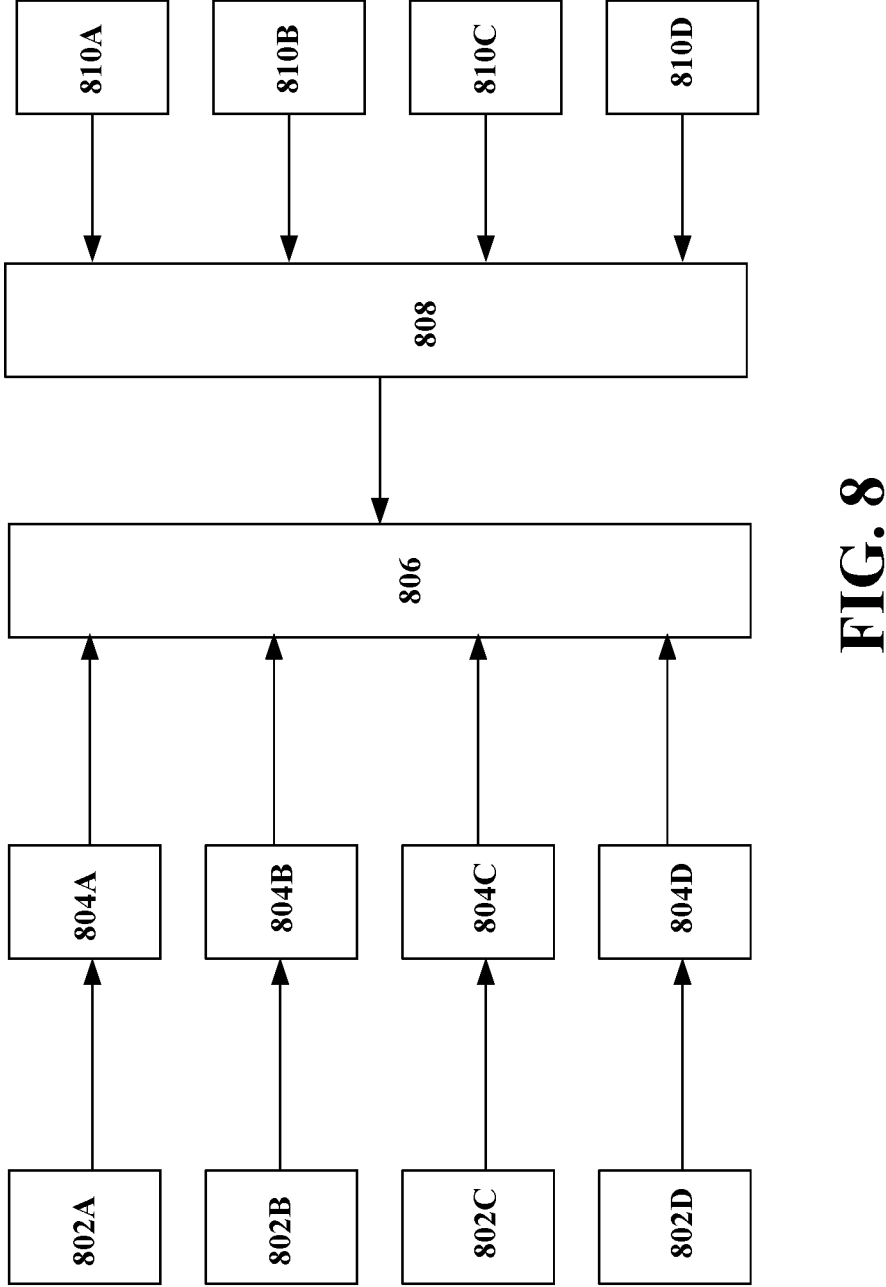
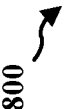
FIG. 8

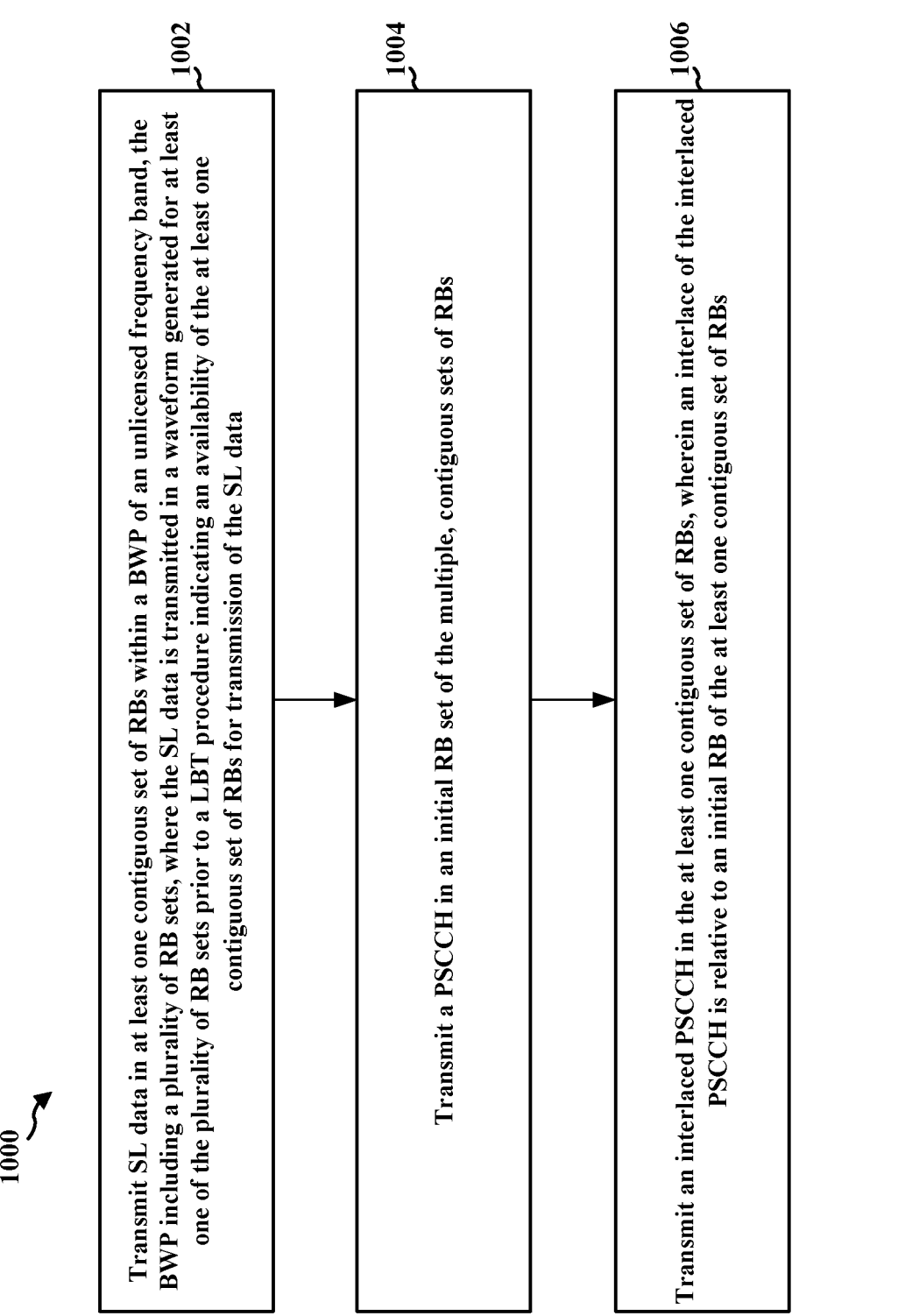

1000

Transmit SL data in at least one contiguous set of RBs within a BWP of an unlicensed frequency band, the BWP including a plurality of RB sets, where the SL data is transmitted in a waveform generated for at least one of the plurality of RB sets prior to a LBT procedure indicating an availability of the at least one contiguous set of RBs for transmission of the SL data

1002

Transmit a PSCCH in an initial RB set of the multiple, contiguous sets of RBs

1004

Transmit an interlaced PSCCH in the at least one contiguous set of RBs, wherein an interlace of the interlaced PSCCH is relative to an initial RB of the at least one contiguous set of RBs

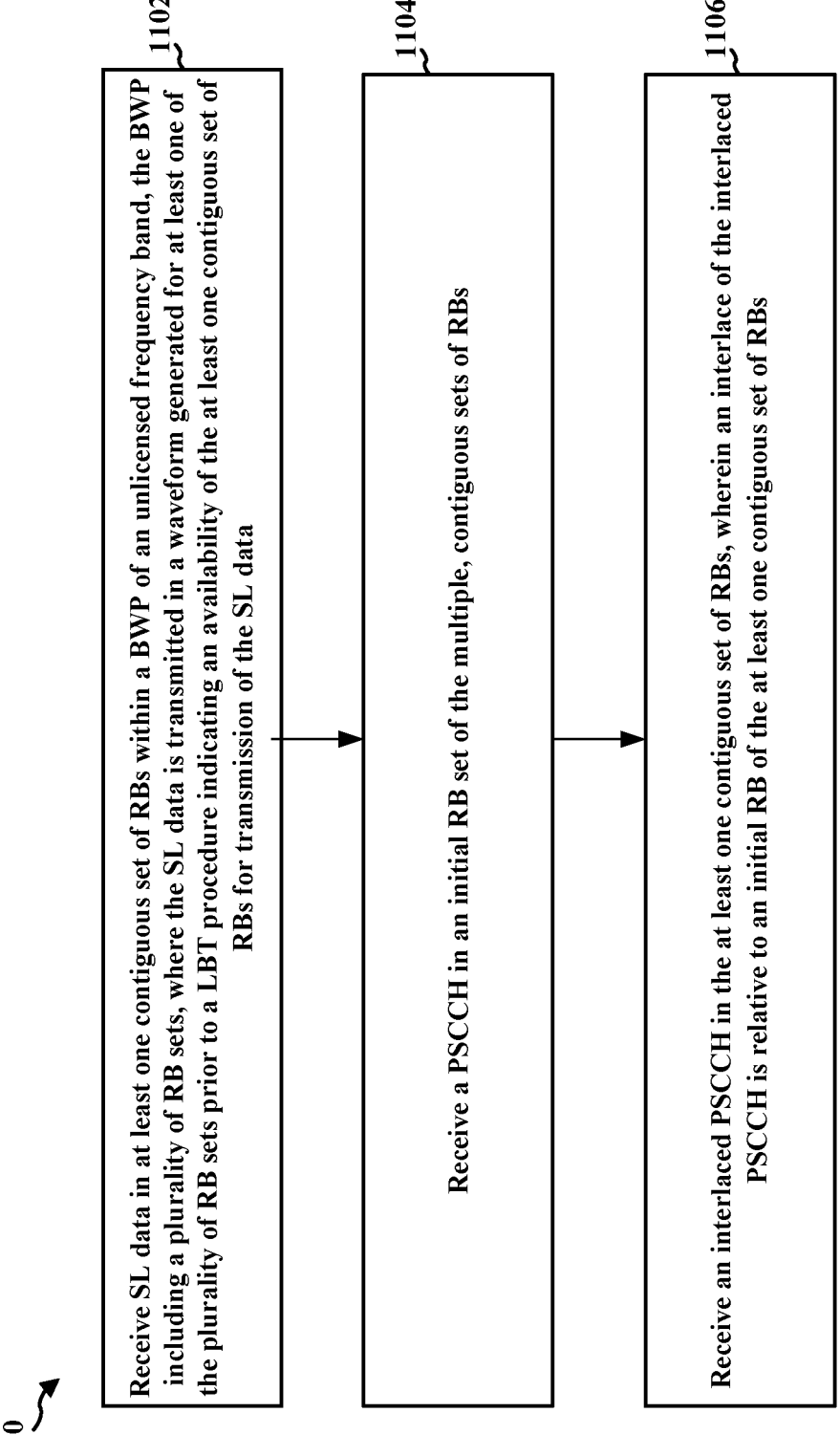

Receive SL data in at least one contiguous set of RBs within a BWP of an unlicensed frequency band, the BWP including a plurality of RB sets, where the SL data is transmitted in a waveform generated for at least one of the plurality of RB sets prior to a LBT procedure indicating an availability of the at least one contiguous set of RBs for transmission of the SL data

1102

Receive a PSCCH in an initial RB set of the multiple, contiguous sets of RBs

1104

Receive an interlaced PSCCH in the at least one contiguous set of RBs, wherein an interlace of the interlaced PSCCH is relative to an initial RB of the at least one contiguous set of RBs

PSCCH AND PSSCH TRANSMISSION ON CONTIGUOUS RB SETS IN SL-U

BACKGROUND

Technical Field

The present disclosure generally relates to communication systems, and more particularly, to a wireless communication system involving direct communication between wireless devices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The deployment of sidelink communications within cellular communications presents additional challenges because sidelink communications, especially sidelink-unlicensed (SL-U) communications, may have channel access uncertainty that may limit the ability of some devices to operate in SL-U environments. Listen-before-talk (LBT) requirements of SL-U spectrum limit the amount of bandwidth that a given device can use, because in LBT the device determines whether the channel is available before the channel is accessed.

The present disclosure provides solutions to SL-U transmission/reception problems by preparing control and data waveforms for multiple resource blocks (RBs) in a given SL-U bandwidth or bandwidth part (BWP). Upon determining the availability of RBs or sets of RBs the apparatuses and methods of the present disclosure allow for dynamic determination and use of available SL-U frequencies and BWP.

In an aspect of the disclosure, a method, a computer-readable medium, and an apparatus are provided. The apparatus may comprise a memory and at least one processor coupled to the memory and configured to transmit sidelink (SL) data in at least one contiguous set of resource blocks (RBs) within a bandwidth part (BWP) of an unlicensed frequency band, the BWP including a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data.

Such an apparatus further optionally includes each of the plurality of RB sets including a physical sidelink control channel (PSCCH) candidate resource, the at least one contiguous set of RBs including multiple, contiguous sets of RBs, and the at least one processor being further configured to transmit a PSCCH in an initial RB set of the multiple, contiguous sets of RBs.

Such an apparatus further optionally includes the at least one processor is further configured to transmit an interlaced PSCCH in the at least one contiguous set of RBs, an interlace of the interlaced PSCCH being relative to an initial RB of the at least one contiguous set of RBs, the at least one contiguous set of RBs including multiple, contiguous sets of RBs, and the at least one processor being further configured to transmit an interlaced PSCCH in one of the multiple, contiguous sets of RBs, an interlace of the interlaced PSCCH omitting RBs in a guard band between adjacent ones of the multiple, contiguous sets of RBs.

Such an apparatus further optionally includes the at least one contiguous set of RBs including multiple, contiguous sets of RBs, the SL data is transmitted in a physical sidelink shared channel (PSSCH), and the PSSCH spans the multiple, contiguous sets of RBs, the at least one processor being further configured to transmit an indication in sidelink control information (SCI) of a frequency domain resource assignment (FDRA) of the PSSCH spanning the multiple, contiguous sets of RBs, wherein the indication of the FDRA is irrespective of the plurality of RB sets from which the multiple, contiguous sets of RBs are based, the FDRA being relative to an initial RB in an initial RB set of the multiple, contiguous sets of RBs, and the PSSCH including RBs within a guard band between adjacent ones of the multiple, contiguous sets of RBs.

Such an apparatus further optionally includes the PSSCH being an interlaced PSSCH, and an interlace of the interlaced PSSCH is relative to an initial RB of an initial RB set of the multiple, contiguous sets of RBs, the PSSCH being an interlaced PSSCH, and an interlace of the interlaced PSSCH is irrespective of the plurality of RB sets from which the multiple, contiguous sets of RBs are based.

A method of wireless communication at a sidelink entity in accordance with an aspect of the present disclosure may include transmitting sidelink (SL) data in at least one contiguous set of resource blocks (RBs) within a bandwidth part (BWP) of an unlicensed frequency band, the BWP including a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data.

Such a method may further optionally include each of the plurality of RB sets including a physical sidelink control channel (PSCCH) candidate resource, the at least one contiguous set of RBs including multiple, contiguous sets of RBs, and further comprising transmitting a PSCCH in an initial RB set of the multiple, contiguous sets of RBs, and further comprising transmitting an interlaced PSCCH in the at least one contiguous set of RBs, wherein an interlace of the interlaced PSCCH is relative to an initial RB of the at least one contiguous set of RBs.

An apparatus in accordance with an aspect of the present disclosure may include a memory and at least one processor coupled to the memory and configured to receive sidelink (SL) data in at least one contiguous set of resource blocks (RBs) within a bandwidth part (BWP) of an unlicensed frequency band, the BWP including a plurality of RB sets, wherein the SL data is received in a waveform generated for at least one of the plurality of RB sets prior to a listen-before-talk (LBT) procedure indicating an availability of the at least one contiguous set of RBs for transmission of the SL data.

Such an apparatus may further optionally include each of the plurality of RB sets including a physical sidelink control channel (PSCCH) candidate resource, and the at least one contiguous set of RBs including multiple, contiguous sets of RBs, and the at least one processor is further configured to receive a PSCCH in an initial RB set of the multiple, contiguous sets of RBs.

Such an apparatus may further optionally include the at least one processor being further configured to receive an interlaced PSCCH in the at least one contiguous set of RBs wherein an interlace of the interlaced PSCCH is relative to an initial RB of the at least one contiguous set of RBs, the at least one contiguous set of RBs including multiple, contiguous sets of RBs, and the at least one processor is further configured to receive an interlaced PSCCH in one of the multiple, contiguous sets of RBs, wherein an interlace of the interlaced PSCCH omits RBs in a guard band between adjacent ones of the multiple, contiguous sets of RBs.

Such an apparatus may further optionally include the at least one contiguous set of RBs including multiple, contiguous sets of RBs, the SL data is received in a physical sidelink shared channel (PSSCH), and the PSSCH spans the multiple, contiguous sets of RBs.

Such an apparatus may further optionally include the at least one processor being further configured to receive an indication in sidelink control information (SCI) of a frequency domain resource assignment (FDRA) of the PSSCH spanning the multiple, contiguous sets of RBs, wherein the indication of the FDRA is irrespective of the plurality of RB sets from which the multiple, contiguous sets of RBs are based, the FDRA being relative to an initial RB in an initial RB set of the multiple, contiguous sets of RBs, the PSSCH including RBs within a guard band between adjacent ones of the multiple, contiguous sets of RBs, the PSSCH being an interlaced PSSCH, and an interlace of the interlaced PSSCH is relative to an initial RB of an initial RB set of the multiple, contiguous sets of RBs, and the PSSCH is an interlaced PSSCH, and an interlace of the interlaced PSSCH is irrespective of the plurality of RB sets from which the multiple, contiguous sets of RBs are based.

A method of wireless communication at a sidelink entity in accordance with an aspect of the present disclosure may include receiving sidelink (SL) data in at least one contiguous set of resource blocks (RBs) within a bandwidth part (BWP) of an unlicensed frequency band, the BWP including a plurality of RB sets, wherein the SL data is received in a waveform generated for at least one of the plurality of RB sets prior to a listen-before-talk (LBT) procedure indicating an availability of the at least one contiguous set of RBs for transmission of the SL data.

Such a method may further optionally include each of the plurality of RB sets including a physical sidelink control channel (PSCCH) candidate resource, the at least one contiguous set of RBs including multiple, contiguous sets of RBs, and further comprising receiving a PSCCH in an initial RB set of the multiple, contiguous sets of RBs.

Such a method may further optionally include receiving an interlaced PSCCH in the at least one contiguous set of RBs, wherein an interlace of the interlaced PSCCH is relative to an initial RB of the at least one contiguous set of RBs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 illustrates a listen-before-talk schema in accordance with an aspect of the present disclosure.

FIG. 8 illustrates a waveform generation schema in accordance with an aspect of the present disclosure.

FIG. 10 is a flowchart of a method of wireless communication in accordance with an aspect of the present disclosure.

FIG. 11 is a flowchart of a method of wireless communication in accordance with an aspect of the present disclosure.

DETAILED DESCRIPTION

Figure 1:
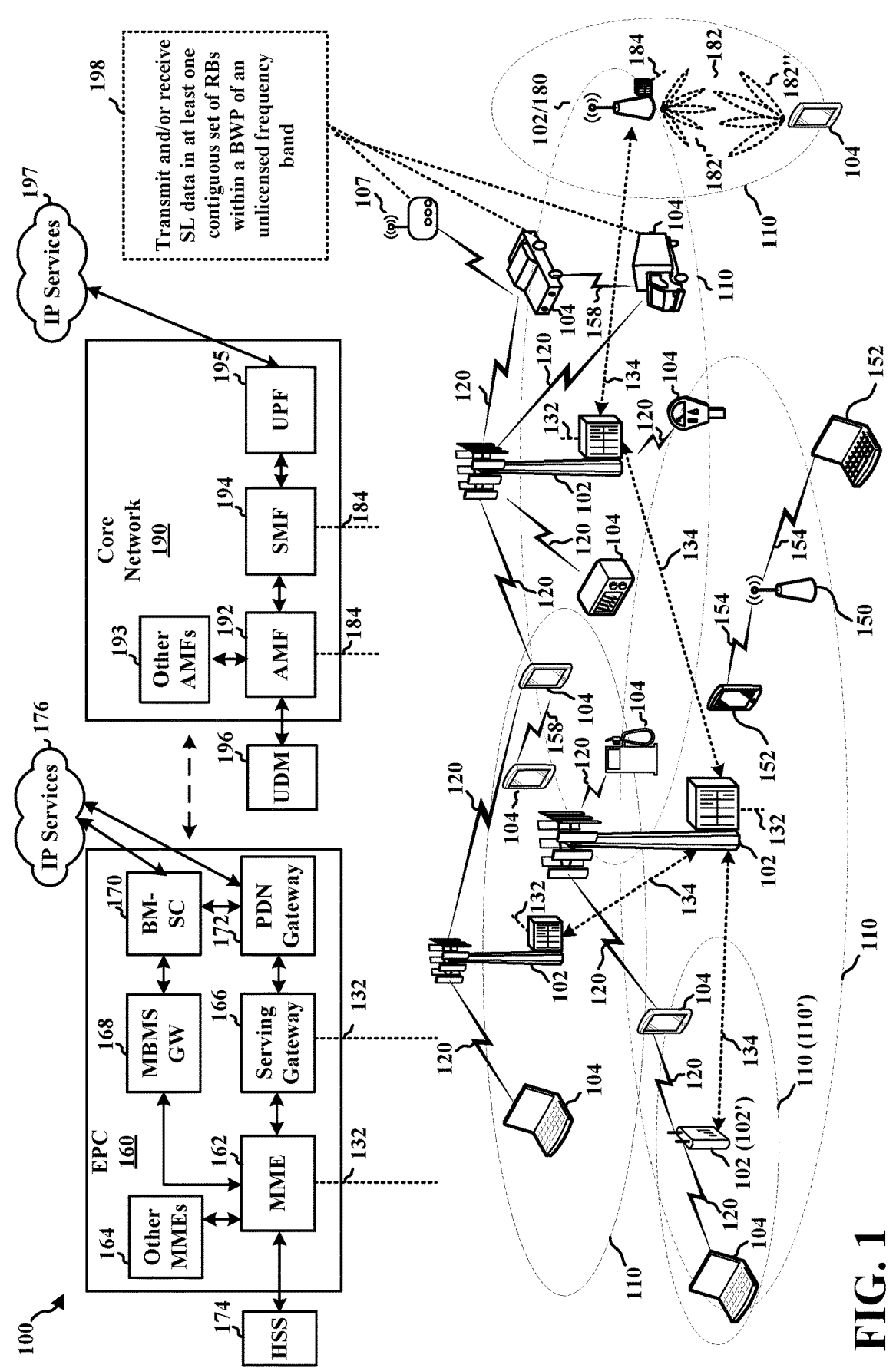
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication, e.g., as described in connection with the example in FIG. 3.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Further, although the present disclosure may focus on device-to-device (D2D) communications, the concepts and various aspects described herein may be applicable to other similar areas, such as vehicle-to-everything (V2X) communication, IoT communication, Industrial IoT (IIoT) communication, and/or other standards/protocols for communication in wireless/access networks. Additionally or alternatively, the concepts and various aspects described herein may be of particular applicability to one or more specific areas, such as vehicle-to-pedestrian (V2P) communication, pedestrian-to-vehicle (P2V) communication, vehicle-to-infrastructure (V2I) communication, and/or other frameworks/models for communication in wireless/access networks.

Referring again to FIG. 1, in certain aspects, a sidelink entity (e.g., the UE 104, the RSU 107) may be configured to transmit and/or receive sidelink (SL) data in at least one contiguous set of resource blocks (RBs) within a bandwidth part (BWP) of an unlicensed frequency band 198.

Figures 2A, 2B, 2C, 2D:
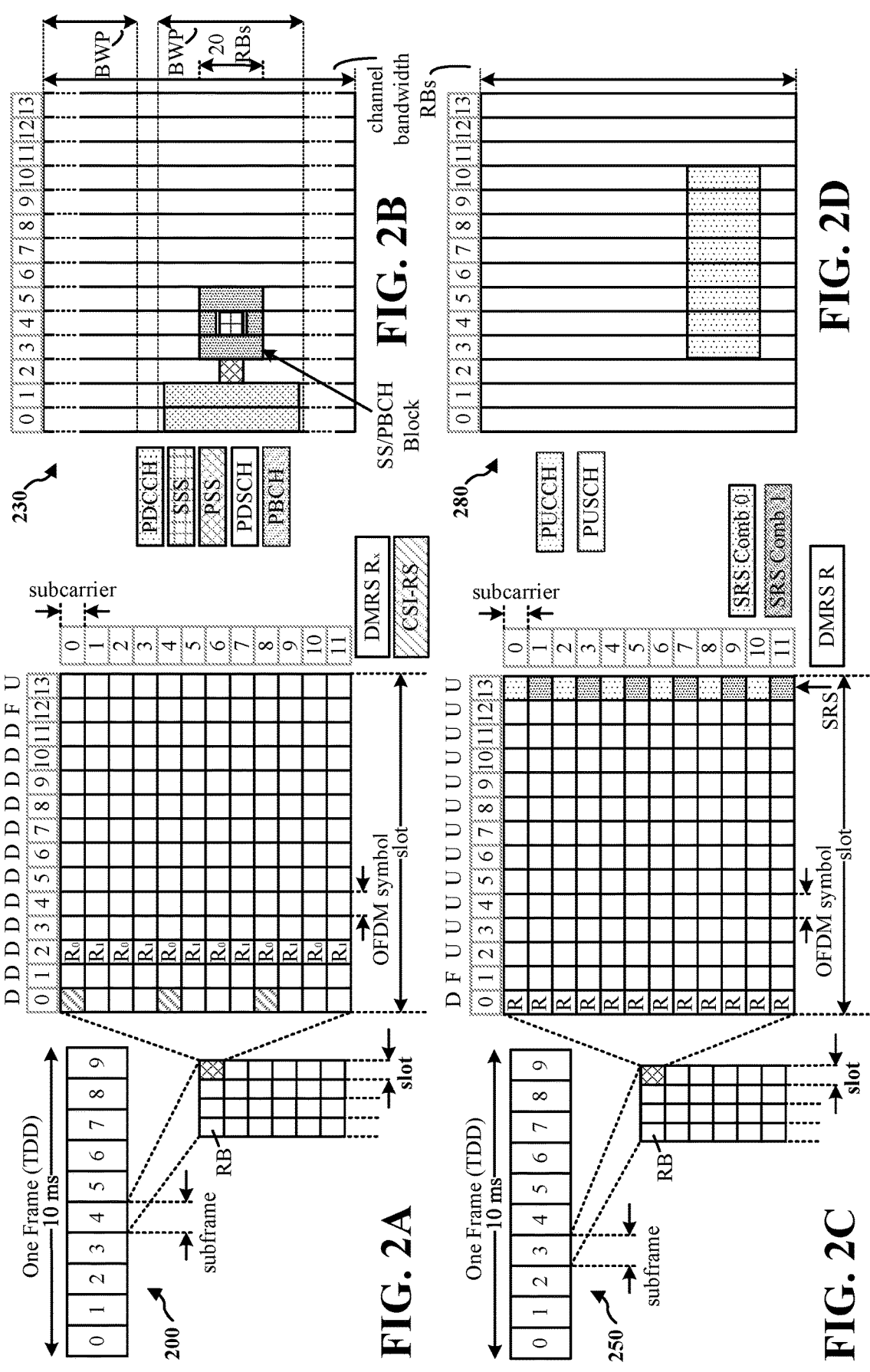
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
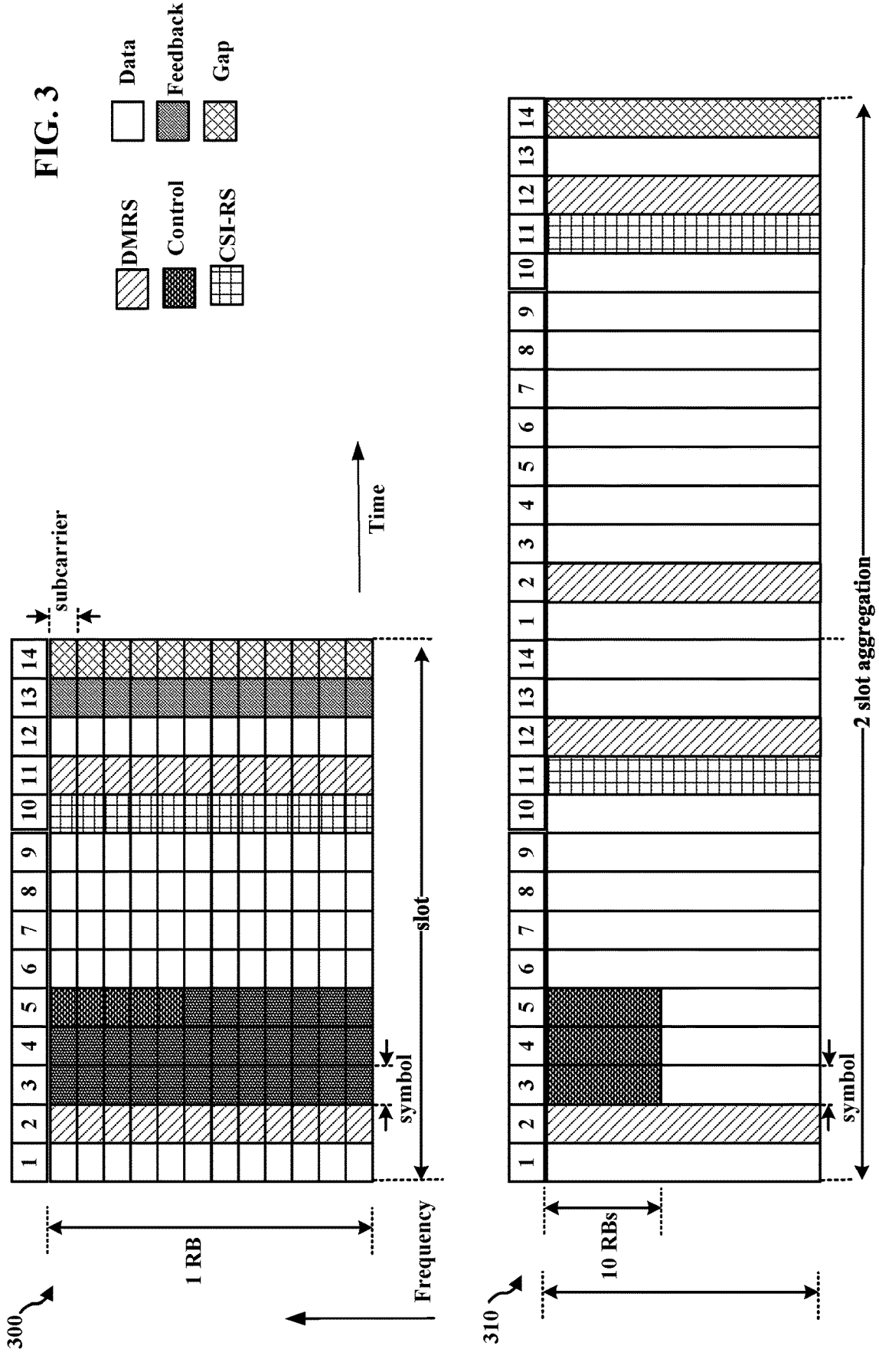
FIG. 3 illustrate example aspects of a sidelink slot structure.

FIG. 3 illustrates example diagrams 300 and 310 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

Figure 4:
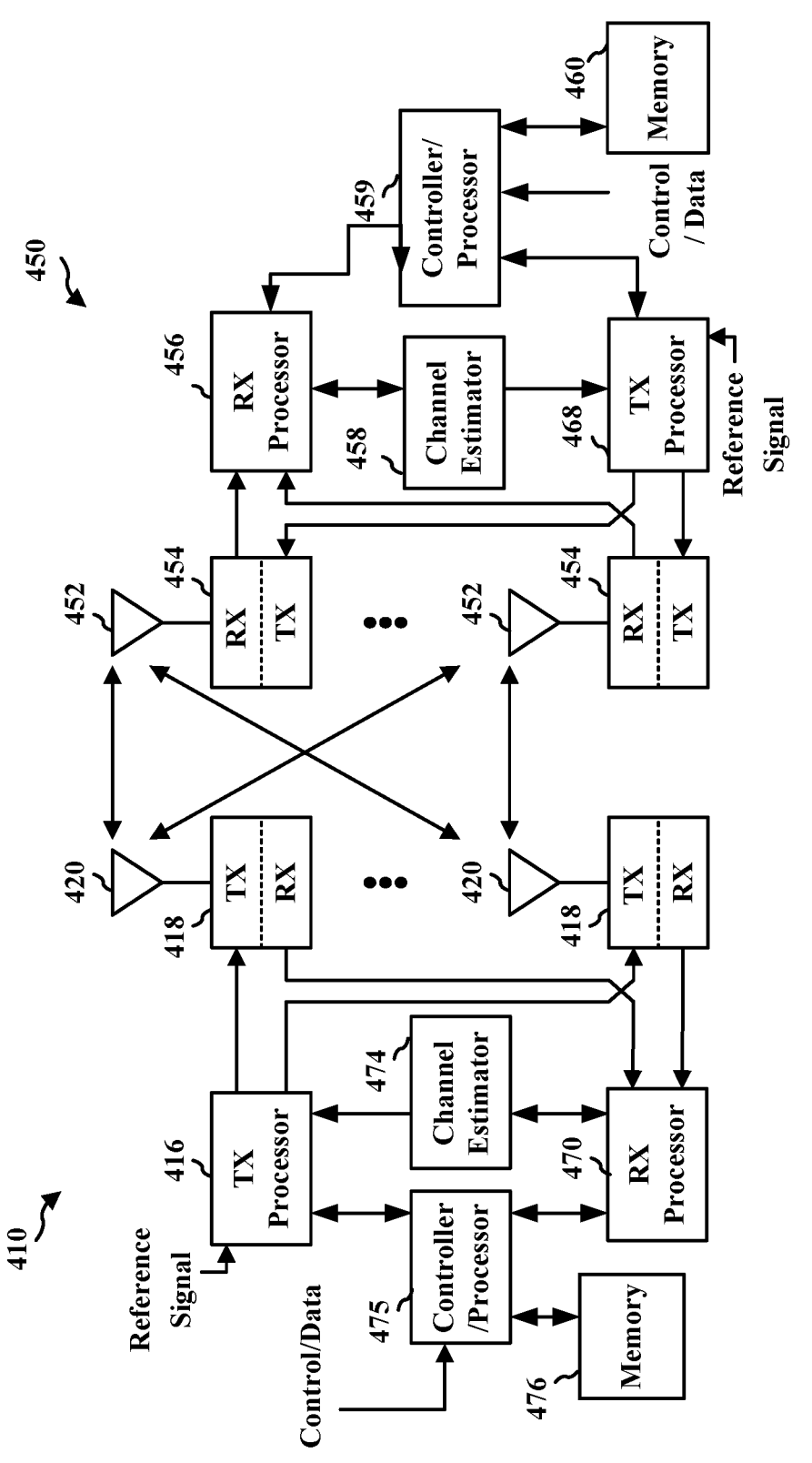
FIG. 4 is a diagram illustrating an example of a first device and a second device involved in wireless communication based, e.g., on sidelink communication.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example. FIG. 4 is a block diagram of a first wireless communication device 410 in communication with a second wireless communication device 450, e.g., via V2V/V2X/D2D communication or in an access network. The device 410 may comprise a transmitting device communicating with a receiving device, e.g., device 450, via V2V/V2X/D2D communication. The communication may be based, e.g., on sidelink, downlink, or uplink. The communication device 410 may comprise a UE, a base station, an RSU, etc. The receiving device 450 may comprise a UE, a base station, an RSU, etc.

IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the communication device 410. These soft decisions may be based on channel estimates computed by the channel estimator 458. The soft decisions are then decoded and deinterleaved to recover the data and control signals that were originally transmitted by the communication device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the communication device 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the communication device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the communication device 410 in a manner similar to that described in connection with the receiver function at the communication device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing to recover IP packets from the device 450. IP packets from the controller/processor 475 may be provided to the EPC 160. The controller/processor 475 is also responsible for error detection using an ACK and/or NACK protocol to support HARQ operations.

At least one of the TX processor 416, 468, the RX processor 456, 470, and the controller/processor 459, 475 may be configured to perform aspects in connection with 198 of FIG. 1.

Sidelink communications refers to direct communications among devices 410, 450 (e.g., UEs 104, RSUs 107, etc.). While the following description refers specifically to UEs 104 in the context of sidelink communication, it should be understood that the following description may equally apply to RSUs 107 or other devices (devices 410, 450) which communicate in sidelink. In sidelink communication, interactions between UEs 104 are communicated over a physical sidelink control channel (PSCCH) and a physical sidelink shared channel (PSSCH). For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), D2D, and/or NR-lite.

As such, each UE 104 may transmit and/or receive information on sidelink channels. A "sidelink transmitting UE" can refer to a UE 104 performing a sidelink transmission operation, while a "sidelink receiving UE" can refer to a UE 104 performing a sidelink reception operation. A UE 104 may operate as a transmitting sidelink UE at one time and as a receiving sidelink UE at another time.

NR supports two modes of radio resource allocations (RRA), a mode-1 RRA and a mode-2 RRA, for sidelink communications. The mode-1 RRA supports network controlled RRA that can be used for in-coverage sidelink communication. For instance, a serving BS may determine a radio resource on behalf of a UE 104 and transmit an indication of the radio resource to the UE 104. The mode-2 RRA supports autonomous RRA that can be used for out-of-coverage UEs 104 or partial-coverage UEs 104.

For example, and not by way of limitation, an out-of-coverage UE 104 or a partial-coverage UE 104 may be preconfigured with a sidelink resource pool and may select a radio resource from the preconfigured sidelink resource pool for sidelink communication.

For mode-2 RRA, a UE 104 may perform sensing in a sidelink resource pool. The sensing may include decoding SCI and/or measuring signal energy in the sidelink channel. For SCI decoding, the UE 104 may blindly decode SCI from a PSCCH of each resource. If the decoding is successful, the UE 104 may record the decoded SCI. For signal measurements, the UE 104 may receive a signal from each resource and compute a reference signal received power (RSRP) and/or receive signal strength indicator (RSSI) for each resource.

Sidelink channels may be divided into bandwidth parts (BWPs) that include resource blocks (RBs) within each portion of the BWP. Each BWP may have a particular numerology. Each BWP may be further divided into one or more groups of RBs, called RB sets, that are contained within each slot, subframe, or portion of a given BWP.

Figures 5A, 5B:
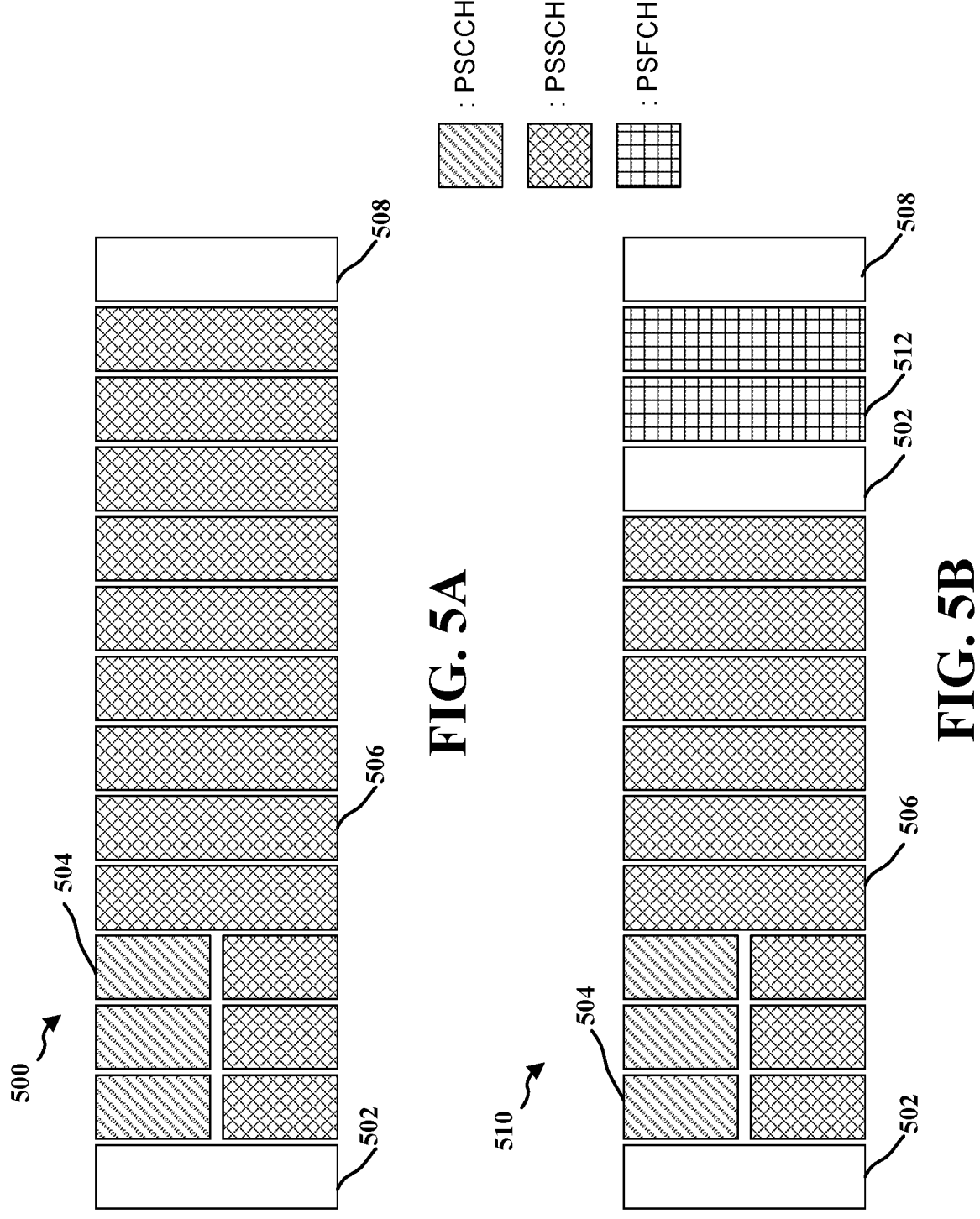
FIGS. 5A and 5B are diagrams illustrating sidelink slot structures in accordance with an aspect of the present disclosure.

FIGS. 5A and 5B are diagrams illustrating sidelink slot structures in accordance with an aspect of the present disclosure.

FIGS. 5A and 5B illustrate different slot structures for sidelink channel communications between UEs 104 not including and including a physical sidelink feedback channel (PSFCH), respectively. As shown in FIGS. 5A and 5B, a slot 500, 510 may include an automatic gain control (AGC) symbol 502, physical sidelink control channel (PSCCH) information 504, physical sidelink shared channel (PSSCH) information 506, and a gap symbol 508 at the end of slot 500. In FIG. 5B, the slot 510 may further include another of AGC symbol 502, and physical sidelink feedback channel (PSFCH) information 512. Each symbol in slot 500, 510 may be an orthogonal frequency division multiplexing (OFDM) symbol and the PSCCH information 504 includes sidelink control information (SCI), such as SCI-1.

In the structures shown in FIGS. 5A and 5B, the SCI, such as SCI-1, that is contained in PSCCH information may include PSSCH resource allocation, a modulation and coding scheme (MCS) for the sidelink channel, a demodulation reference signal (DMRS) and the number of DMRS ports, and formats and offsets for other SCI information, such as SCI-2.

The slots 500 and 510 may be used in unlicensed sidelink (SL-U) spectrum to allow for communication between UEs 104. For example, and not by way of limitation, the 5 GHz spectrum, or other portions of the electromagnetic spectrum, may be used to allow for D2D or other intra-UE 104 communications.

Figure 6:
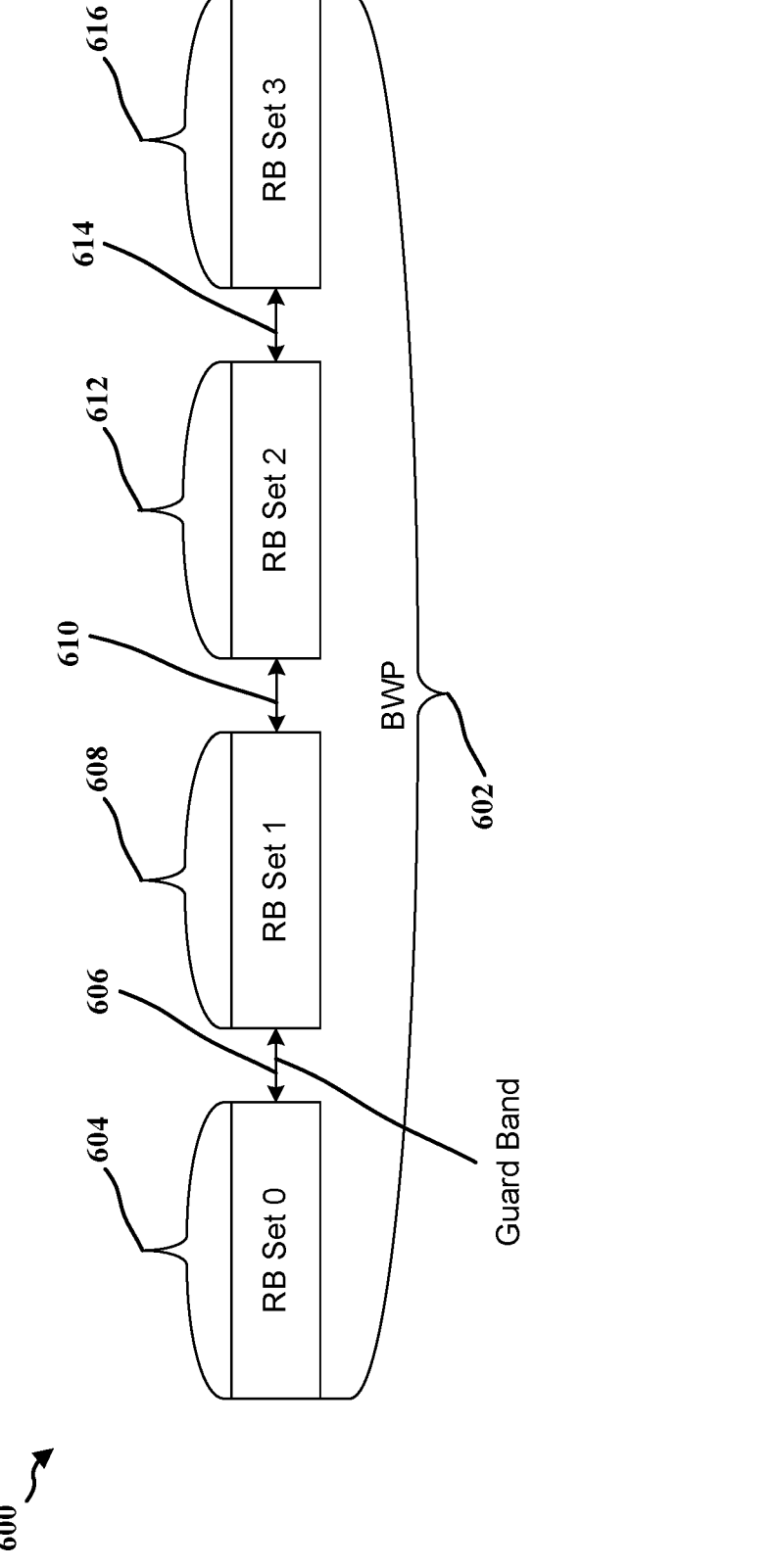
FIG. 6 illustrates a resource block based operation of communication in accordance with an aspect of the present disclosure.

FIG. 6 illustrates a resource block based operation of communication in accordance with an aspect of the present disclosure.

A frequency band 600 in SL-U communication may be divided into various parts for consistent communication between UEs 104. As described with respect to FIGS. 5A-5B, BWP 602 may be divided into RBs.

In an aspect of the present disclosure, a BWP 602 may be divided into RB set 604, guard band 606, RB set 608, guard band 610, RB set 612, guard band 614, and RB set 616. Other divisions of BWP 602 are possible without deviating from the scope of the present disclosure.

In an aspect of the present disclosure, one or more frequency bands 600, e.g., the 5 GHz spectrum, frequency range 1 (FR1), etc., may be used to allow intra-UE 104 communications. Access to these frequency bands 600, as well as individual BWPs 602 within the frequency bands 600, may be selectively granted based on a listen-before-talk (LBT) schema.

Each of the RB sets 604, 608, 612, and 616 may include a plurality of RBs for transmission in the sidelink BWP 602. For example, and not by way of limitation, each RB set 604, 608, 612, and 616 may occupy a 20 MHz bandwidth in the BWP 602, and each RB set 604, 608, 612, and 616 may include 50 RBs. Each of the guard bands 606, 610, and 614 may include five to six RBs. Further, although shown as approximately equivalent in size, the guard bands 606, 610, and 614 may be different sizes, e.g., guard band 606 may include five RBs, while guard band 610 includes six RBs.

In an aspect of the present disclosure, UE 104 may determine which RBs and/or RB sets 604, 608, 612, and 616 are available for transmission to other UE 104. This determination may be performed by LBT sensing for each of the RB sets 604, 608, 612, and 616, and transmission may be performed on those sets that are available for transmission. Each BWP 602 in sidelink frequency band 600 can be configured to include one or more RB sets 604, 608, 612, and 616 as desired. Further, a larger or smaller number of RB sets 604, 608, 612, and 616 can be configured within each BWP 602 within a sidelink frequency band 600.

The size (in terms of RBs) of RB sets 604, 608, 612, and 616 can also be altered, as well as the size (in terms of RBs) of guard bands 606, 610, and 614, without departing from the scope of the present disclosure.

FIG. 7 illustrates a listen-before-talk schema in accordance with an aspect of the present disclosure.

The deployment of sidelink communications over an unlicensed sidelink spectrum is referred to as sidelink-unlicensed (SL-U). Some communications may occur for SL-U deployment over 5 gigahertz (GHz) unlicensed bands. Channel access in an unlicensed band may be regulated or implemented using various schema. For example, and not by way of limitation, a listen-before-talk (LBT) schema may be imposed on some unlicensed bandwidth spectrum.

To perform an LBT, a transmitting UE 104 may listen to the sidelink channel (e.g., BWP 602, RB sets 604, 608, 612, 616, etc.), to determine whether there are active transmissions in the channel. Such determinations may be made using various techniques, including measuring channel signal energy in each of the RB sets 604, 608, 612, 616 or the BWP 602. When the RB set(s) 604, 608, 612, 616 are idle, the transmitting UE 104 may transmit in the RB sets 604, 608, 612, 616 which are respectively idle. However, if the RB set 604, 608, 612, 616 is being used by another UE 104, the transmitting UE 104 may refrain from accessing the RB set 604, 608, 612, 616 which is/are being respectively used by the other UE.

In an aspect of the present disclosure, LBT can lead to channel access uncertainty for a UE 104. Because autonomous mode-2 RRA and sensing are designed to operate over licensed bands, such schema may not be able to operate in spectra where channel access uncertainty exists. For example, and not by way of limitation, a set of predetermined and/or preconfigured parameters may not account for channel access uncertainty. Thus, a resource selection window defined based on the predetermined and/or preconfigured parameters may start before an LBT is completed, and thus the resource selection window may be outdated. Additionally, the duration of the resource selection window based on the predetermined and/or preconfigured parameters may be too short to accommodate an LBT prior to transmission by the UE 104.

As shown in FIG. 7, a LBT subframe 700 may have a duration 702, with sensing windows 704 and calculation periods 706. Sensing window 704 may have duration 708, while the sensing window 704 and calculation period 706 have a combined duration 710.

For example, and not by way of limitation, duration 702 may be 25 microseconds, duration 708 may be 4 microseconds, and duration 710 may be 9 microseconds, which leaves only 5 microseconds to determine whether a given transmission bandwidth is available for transmission of PSCCH/PSSCH information by the UE 104.

As such, in an aspect of the present disclosure, UE 104 only has a short duration to determine which RB set(s) 604, 608, 612, 616 are available for transmission. A duration of 5 microseconds may not be long enough for UE 104 to prepare the transmission data, data packets, and generate a proper waveform for transmission in a SL-U schema that lacks preconfigured transmission/reception parameters.

In an aspect of the present disclosure, LBT sensing may be performed on one or more RB sets 604, 608, 612, 616 or one or more starting transmission symbols to determine which RB set(s) 604, 608, 612, 616 are available for transmission by a given UE 104. In such an aspect, UE 104 may dynamically select which one or more RB sets 604, 608, 612, 616 to use for transmission of PSCCH/PSSCH data.

FIG. 8 illustrates a waveform generation schema in accordance with an aspect of the present disclosure.

System 800 illustrates PSCCH/PSSCH generators 802A-802D, waveform up-samplers 804A-804D, frequency shifter 806, waveform selector 808, and LBT sensors 810A-810D.

PSCCH/PSSCH generators 802A-802D each compute a waveform for PSCCH/PSSCH data based on a number of RB set(s) 604, 608, 612, 616 that may be available for transmission. For example, and not by way of limitation, PSCCH/PSSCH generator 802A may generate a PSCCH/PSSCH waveform for RB set 604, PSCCH/PSSCH generator 802B may generate a PSCCH/PSSCH waveform for RB sets 604 and 608, PSCCH/PSSCH generator 802C may generate a PSCCH/PSSCH waveform for RB sets 604, 608, and 612, and PSCCH/PSSCH generator 802D may generate a PSCCH/PSSCH waveform for RB sets 604, 608, 612, and 616. A larger or smaller number of PSCCH/PSSCH generators 802A-802D may be used depending on the number of RB sets 604, 608, 612, and 616 are used in BWP 602.

Waveform upsamplers 804A-804D may be used to upconvert or upsample the PSCCH/PSSCH waveforms generated in PSCCH/PSSCH generators 802A-802D. Waveform upsamplers 804A-804D may be implemented as filters or other circuitry as desired.

Frequency shifter 806 shifts the frequency of the waveforms coming from waveform upsamplers 804A-804D to match the available combination of contiguous RB sets 604, 608, 612, and 616 that are available for transmission.

LBT sensors 810A-810D determine the availability of RB set(s) 604, 608, 612, 616. For example, and not by way of limitation, LBT sensor 810A determines the availability of RB set 604 for transmission, LBT sensor 810B determines the availability of RB set 608 for transmission, LBT sensor 810C determines the availability of RB set 612 for transmission, and LBT sensor 810D determines the availability of RB set 616 for transmission.

Waveform selector 808 determines, based on inputs from LBT sensors 810A-810D which continuous RB sets 604,

608, 612, and 616 are available for transmission of the PSCCH/PSSCH data. If only one RB set is available, waveform selector 808 passes that information to frequency shifter 806, which selects the waveform generated by PSCCH/PSSCH generator 802A as upsampled by waveform upsampler 804A. If two contiguous RB sets are available, waveform selector 808 passes that information to frequency shifter 806, which selects the waveform generated by PSCCH/PSSCH generator 802B as upsampled by waveform upsampler 804B, shifted to the appropriate two contiguous RB sets in BWP 602. If three contiguous RB sets are available, waveform selector 808 passes that information to frequency shifter 806, which selects the waveform generated by PSCCH/PSSCH generator 802C as upsampled by waveform upsampler 804C, shifted to the appropriate three contiguous RB sets in BWP 602. If four contiguous RB sets are available, waveform selector 808 passes that information to frequency shifter 806, which selects the waveform generated by PSCCH/PSSCH generator 802D as upsampled by waveform upsampler 804D, shifted to the appropriate four contiguous RB sets in BWP 602.

As such, depending on the number of RB sets 604, 608, 612, and 616 that are available for transmission as determined by LBT sensors 810A-810D, the waveform produced by one of the PSCCH/PSSCH generators 804A-804D will be selected, upsampled by waveform upsamplers 804A-804D, frequency shifted by frequency shifter 806, and transmitted on the available RB sets 604, 608, 612, and 616. The selected waveform is then passed to the transmitter of the sidelink entity as described herein.

Based on the availability of RB sets 604, 608, 612, and 616, and which of RB sets 604, 608, 612, and 616 are contiguously available, different transmission waveforms may be produced by system 800. For example, and not by way of limitation, if two contiguous RB sets, e.g., RB sets 608 and 612, are available for transmission, then the PSCCH/PSSCH waveform from PSCCH/PSSCH generator 802B is upsampled by waveform upsampler 804B, and the waveform is frequency shifted and selected by waveform selector 808. Other possibilities of contiguous RB sets and other numbers of waveform generators, waveform upsamplers, and LBT sensors are possible without departing from the scope of the present disclosure.

As discussed with respect to FIG. 8, multiple RB-set hypotheses for transmission of PSCCH/PSSCH data are possible. These hypotheses are based on a number of contiguous RB sets 604, 608, 612, and 616 that are or may be available for transmission. Rather than determining the available RB sets 604, 608, 612, and 616 in series after the sensing window 704, the available RB sets 604, 608, 612, and 616 are determined in parallel and the waveform(s) for each of the possible single RB sets 604, 608, 612, and 616 are prepared. As the sensing of multiple, contiguous blocks of RB sets 604, 608, 612, and 616 are determined to be available, multiple, contiguous blocks of RB sets 604, 608, 612, and 616 are used as transmission resources by the UE 104 or other sidelink entity. In an aspect of the present disclosure, a maximum number of contiguous RB sets 604, 608, 612, and 616 that have passed LBT sensing (by LBT sensors 810A-810D) are selected for transmission of PSCCH/PSSCH data. Further, multiple PSCCH/PSSCH waveforms can be selected if the UE 104 supports transmission of multiple PSCCH/PSSCH signals.

Figure 9:
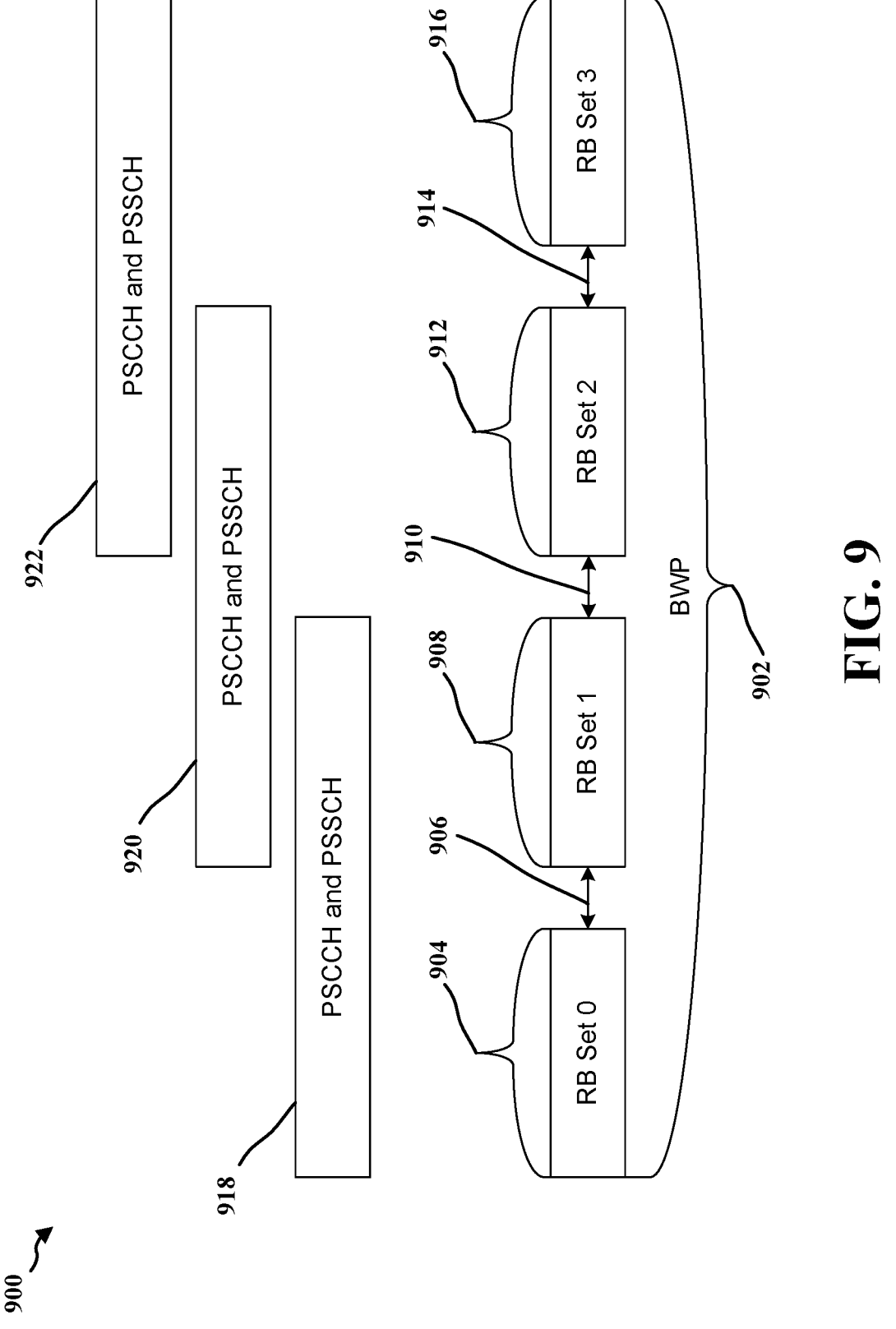
FIG. 9 illustrates an example transmission schema in accordance with an aspect of the present disclosure.

FIG. 9 illustrates an example transmission schema in accordance with an aspect of the present disclosure.

A frequency band 900 in SL-U communication may be divided into various parts for consistent communication between UEs 104. As described with respect to FIGS. FIGS. 5A-5B, and FIG. 6, BWP 902 may be divided into RBs.

In an aspect of the present disclosure, a BWP 902 may be divided into RB set 904, guard band 906, RB set 908, guard band 910, RB set 912, guard band 914, and RB set 916. Other divisions of BWP 902 are possible without deviating from the scope of the present disclosure.

In an aspect of the present disclosure, one or more frequency bands 900, e.g., the 5 GHz spectrum, frequency range 1 (FR1), etc., may be used to allow intra-UE 104 communications. Access to these frequency bands 900, as well as individual BWPs 902 within the frequency bands 600, may be selectively granted based on an LBT schema.

Each of the RB sets 904, 908, 912, and 916 may include a plurality of RBs for transmission in the sidelink BWP 902. For example, and not by way of limitation, each RB set 904, 908, 912, and 916 may occupy a 20 MHz bandwidth in the BWP 902, and each RB set 904, 908, 912, and 916 may include 50 RBs. Each of the guard bands 906, 910, and 914 may include five to six RBs. Further, although shown as approximately equivalent in size, the guard bands 906, 910, and 914 may be different sizes, e.g., guard band 906 may include five RBs, while guard band 910 includes six RBs.

As described above, with respect to FIG. 8, UE 104 may determine which RBs and/or RB sets 904, 908, 912, and 916 are available for transmission to other UE 104. Transmission of PSCCH/PSSCH data may then be performed on those RB sets that are available for transmission.

For example, and not by way of limitation, if UE 104 determines that RB sets 904 and 908 are available for transmission, then UE 104 can transmit the PSCCH/PSSCH waveform as waveform 918. Similarly, if UE 104 determines that RB sets 908 and 912 are available for transmission, then UE 104 can transmit the PSCCH/PSSCH waveform as waveform 920. Similarly, if UE 104 determines that RB sets 912 and 916 are available for transmission, then UE 104 can transmit the PSCCH/PSSCH waveform as waveform 922.

The UE 104 can, in an aspect of the present disclosure, select a PSCCH/PSSCH waveform to be transmitted on contiguous RB sets 904, 908, 912, and 916 that is transparent to the selection of RB sets. For a PSCCH/PSSCH waveform that occupies N≤M RB sets, such a waveform can be transmitted and/or received in any of N contiguous RB sets 904, 908, 912, and 916 within BWP 902 having M RB sets, where M is the number of RB sets 904, 908, 912, and 916 within BWP 902, and N is the number of contiguous RB sets 904, 908, 912, and 916 selected for transmission by UE 104. As such, any one of RB sets 904, 908, 912, and 916, or any contiguous set of RB sets 904, 908, 912, and 916 can be used for transmission of PSCCH/PSSCH data in aspects of the present disclosure.

In an aspect of the present disclosure, where a resource pool (RP) spans multiple RB sets 904, 908, 912, and 916, the PSCCH candidate resource may be configured on each RB set 904, 908, 912, and 916. A UE 104 that is receiving the SL-U transmission may monitor the RP by monitoring the PSCCH in each RB set 904, 908, 912, and 916.

In an aspect of the present disclosure, where PSCCH/PSSCH transmission occupies multiple contiguous RB sets 904, 908, 912, and 916, the PSCCH information may be transmitted on the first RB set 904, 908, 912, and 916 of the contiguous RB sets 904, 908, 912, and 916 that are transmitted.

In an aspect of the present disclosure, the PSCCH waveform may be interlaced. In such an aspect, the interlace for the PSCCH data may be specified relative to the starting RB of each RB set 904, 908, 912, and 916. The interlace for PSCCH data may not include RBs in the guard bands 906, 910, and 914 between adjacent RB sets 904, 908, 912, and 916.

In an aspect of the present disclosure, PSSCH resources may also span multiple contiguous RB sets 904, 908, 912, and 916. In such an aspect, when the PSSCH data spans across N contiguous RB sets 904, 908, 912, and 916, an SCI-1 indication of a frequency domain resource assignment (FDRA) may be the same irrespective of which RB sets 904, 908, 912, and 916 are selected for transmission by the UE 104.

The PSSCH data over N contiguous RB sets 904, 908, 912, and 916 may also be defined relative to a starting or first RB of the first RB set within N contiguous RB sets 904, 908, 912, and 916, and RBs in the guard bands 906, 910, and 914 of contiguous RB sets 904, 908, 912, and 916 can be used for PSSCH transmission.

PSSCH waveforms may also be interlaced. An interlace for PSSCH may be specified relative to a starting RB of the first RB set 904, 908, 912, and 916, and a number of RBs for each interlace index spanning N contiguous RB sets 904, 908, 912, and 916 may be the same irrespective of which of N contiguous RB sets 904, 908, 912, and 916 are selected within BWP 902.

FIG. 10 is a flowchart 1000 of a method of wireless communication. The method may be performed by a sidelink entity (e.g., the UE 104; RSU 107, device 410; the apparatus 1202). At 1002, the sidelink entity may transmit sidelink (SL) data in at least one contiguous set of resource blocks (RBs) within a bandwidth part (BWP) of an unlicensed frequency band. The BWP may include a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data. For example, 1002 may be performed by LBT transmission component 1240.

At 1004, the sidelink entity may transmit a PSCCH in an initial RB set of the multiple, contiguous sets of RBs. For example, 1004 may be performed by LBT transmission component 1240.

At 1006, the sidelink entity may transmit an interlaced PSCCH in the at least one contiguous set of RBs, wherein an interlace of the interlaced PSCCH is relative to an initial RB of the at least one contiguous set of RBs. For example, 1006 may be performed by LBT transmission component 1240.

FIG. 11 is a flowchart 1100 of a method of wireless communication. The method may be performed by a sidelink entity (e.g., the UE 104; RSU 107, device 450; the apparatus 1202). At 1102, the sidelink entity may receive sidelink (SL) data in at least one contiguous set of resource blocks (RBs) within a bandwidth part (BWP) of an unlicensed frequency band. The BWP may include a plurality of RB sets, wherein the SL data is received in a waveform generated for at least one of the plurality of RB sets prior to a listen-before-talk (LBT) procedure indicating an availability of the at least one contiguous set of RBs for transmission of the SL data. For example, 1102 may be performed by LBT reception component 1242.

At 1104, the sidelink entity may receive a PSCCH in an initial RB set of the multiple, contiguous sets of RBs. For example, 1104 may be performed by LBT reception component 1242.

At 1106, the sidelink entity may receive an interlaced PSCCH in the at least one contiguous set of RBs, wherein an interlace of the interlaced PSCCH is relative to an initial RB of the at least one contiguous set of RBs. For example, 1106 may be performed by LBT reception component 1242.

Figure 12:
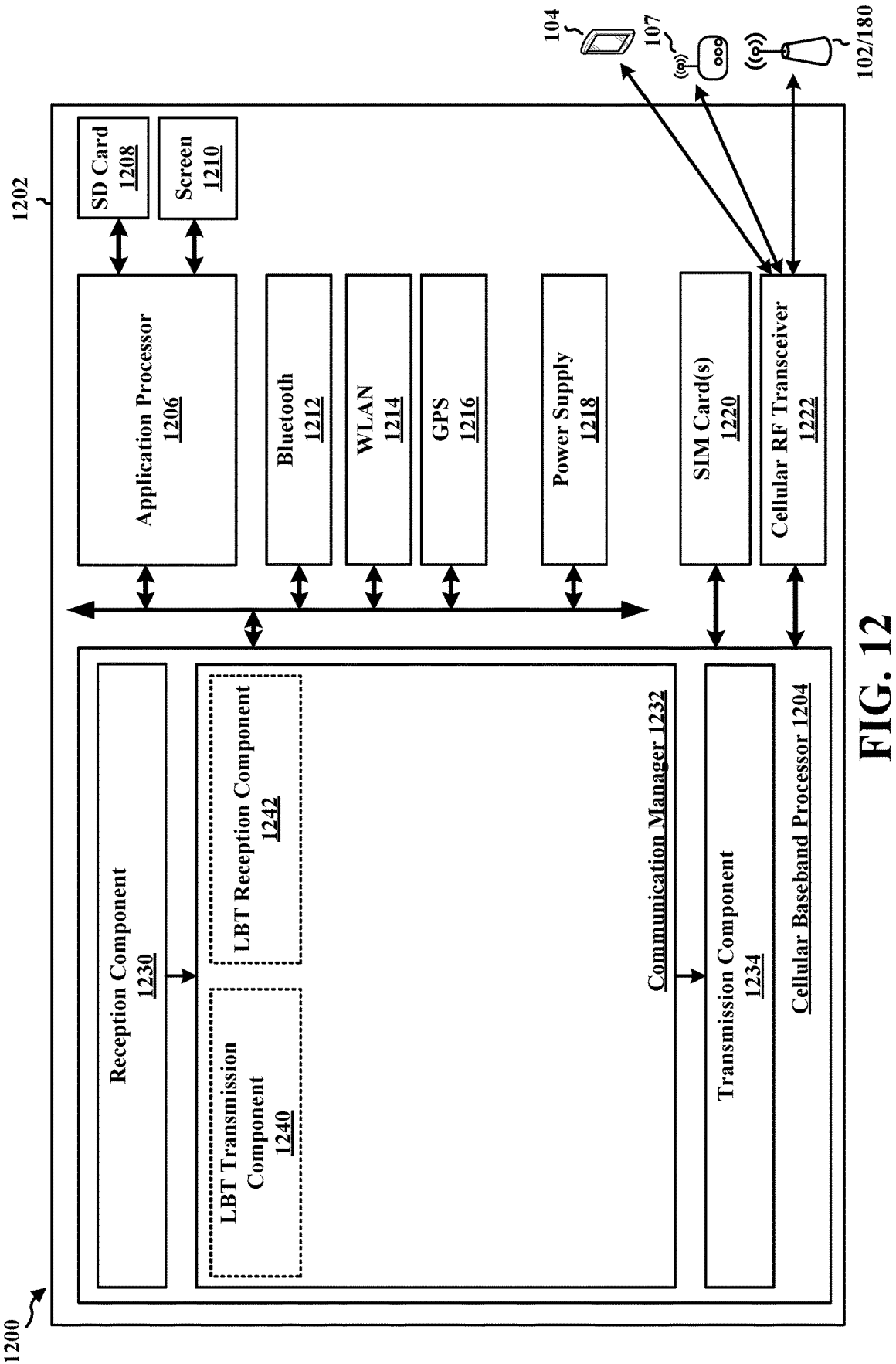
FIG. 12 is a diagram illustrating an example of a hardware implementation for an example apparatus in accordance with an aspect of the present disclosure.

FIG. 12 is a diagram 1200 illustrating an example of a hardware implementation for an apparatus 1202. The apparatus 1202 is a sidelink entity such as a UE or RSU and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104, RSU 107 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the device 410, 450 and may include the memory 460, 476 and/or at least one of the TX processor 428, 468, the RX processor 456, 470 and the controller/processor 459, 475. In one configuration, the apparatus 1202 may be a modem chip and include just the baseband processor 1204, and in another configuration, the apparatus 1202 may be the entire UE, RSU, or other network node (e.g., see device 410, 450 of FIG. 4) and include the aforediscussed additional modules of the apparatus 1202.

The communication manager 1232 includes an LBT transmission component 1240 that is configured to transmit sidelink (SL) data in at least one contiguous set of resource blocks (RBs) within a bandwidth part (BWP) of an unlicensed frequency band. The BWP may include a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data, e.g., as described in connection with 1002. The communication manager 1232 further includes an LBT reception component 1242 that is configured to receive sidelink (SL) data in at least one contiguous set of resource blocks (RBs) within a bandwidth part (BWP) of an unlicensed frequency band. The BWP may include a plurality of RB sets, wherein the SL data is received in a waveform generated for at least one of the plurality of RB sets prior to a listen-before-talk (LBT) procedure indicating an availability of the at least one contiguous set of RBs for transmission of the SL data, e.g., as described in connection with 1102.

LBT transmission component 1240 may also transmit a PSCCH in an initial RB set of the multiple, contiguous sets of RBs, as described in connection with 1004. LBT transmission component 1240 may also transmit an interlaced PSCCH in the at least one contiguous set of RBs, wherein an interlace of the interlaced PSCCH is relative to an initial RB of the at least one contiguous set of RBs, as described in connection with 1006.

LBT reception component 1242 may also receive a PSCCH in an initial RB set of the multiple, contiguous sets of RBs as described in connection with 1104.

LBT reception component 1242 may also receive an interlaced PSCCH in the at least one contiguous set of RBs, wherein an interlace of the interlaced PSCCH is relative to an initial RB of the at least one contiguous set of RBs as described in connection with 1106.

The apparatus may include additional components that perform each of the blocks of the algorithm in the afore-mentioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The present disclosure provides solutions to SL-U transmission/reception problems by preparing control and data waveforms for multiple resource blocks (RBs) in a given SL-U bandwidth or bandwidth part (BWP). Upon determining the availability of RBs or sets of RBs the apparatuses and methods of the present disclosure allow for dynamic determination and use of available SL-U frequencies and BWP.

Because LBT schemes in unlicensed bands can lead to channel access uncertainty for a UE 104, the present disclosure provides solutions to short durations of resource selection windows and allows for dynamic selection of PSCCH/PSSCH transmission portions of available BWP in SL-U frequencies.

An apparatus in accordance with these aspects of the present disclosure may comprise a memory and at least one processor coupled to the memory and configured to transmit and/or receive sidelink (SL) data in at least one contiguous set of resource blocks (RBs) within a bandwidth part (BWP) of an unlicensed frequency band, the BWP including a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is an apparatus for wireless communication, comprising a memory and at least one processor coupled to the memory. The processor is configured to transmit sidelink (SL) data in at least one contiguous set of resource blocks (RBs) within a bandwidth part (BWP) of an unlicensed frequency band, the BWP including a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data.

Example 2 is the apparatus of example 1, wherein each of the plurality of RB sets includes a physical sidelink control channel (PSCCH) candidate resource.

Example 3 is the apparatus of examples 1 or 2, wherein the at least one contiguous set of RBs includes multiple, contiguous sets of RBs, and the at least one processor is further configured to transmit a PSCCH in an initial RB set of the multiple, contiguous sets of RBs.

Example 4 is the apparatus of any of examples 1 to 3, wherein the at least one processor is further configured to: transmit an interlaced PSCCH in the at least one contiguous set of RBs, wherein an interlace of the interlaced PSCCH is relative to an initial RB of the at least one contiguous set of RBs.

Example 5 is the apparatus of any of examples 1 to 4, wherein the at least one contiguous set of RBs includes multiple, contiguous sets of RBs, and the at least one processor is further configured to transmit an interlaced PSCCH in one of the multiple, contiguous sets of RBs, wherein an interlace of the interlaced PSCCH omits RBs in a guard band between adjacent ones of the multiple, contiguous sets of RBs.

Example 6 is the apparatus of any of examples 1 to 5, wherein the at least one contiguous set of RBs includes multiple, contiguous sets of RBs, the SL data is transmitted in a physical sidelink shared channel (PSSCH), and the PSSCH spans the multiple, contiguous sets of RBs.

Example 7 is the apparatus of example 6, wherein the at least one processor is further configured to transmit an indication in sidelink control information (SCI) of a frequency domain resource assignment (FDRA) of the PSSCH spanning the multiple, contiguous sets of RBs, wherein the indication of the FDRA is irrespective of the plurality of RB sets from which the multiple, contiguous sets of RBs are based.

Example 8 is the apparatus of example 7, wherein the FDRA is relative to an initial RB in an initial RB set of the multiple, contiguous sets of RBs.

Example 9 is the apparatus of any of examples 6 to 8, wherein the PSSCH includes RBs within a guard band between adjacent ones of the multiple, contiguous sets of RBs.

Example 10 is the apparatus of any of examples 6 to 9, wherein the PSSCH is an interlaced PSSCH, and an interlace of the interlaced PSSCH is relative to an initial RB of an initial RB set of the multiple, contiguous sets of RBs.

Example 11 is the apparatus of any of examples 6 to 10, wherein the PSSCH is an interlaced PSSCH, and an interlace of the interlaced PSSCH is irrespective of the plurality of RB sets from which the multiple, contiguous sets of RBs are based.

Example 12 is a method of wireless communication at a sidelink entity, comprising transmitting sidelink (SL) data in at least one contiguous set of resource blocks (RBs) within a bandwidth part (BWP) of an unlicensed frequency band, the BWP including a plurality of RB sets, wherein the SL data is transmitted in a waveform generated for at least one of the plurality of RB sets prior to a listen-before-talk (LBT) procedure indicating an availability of the at least one contiguous set of RBs for transmission of the SL data.

Example 13 is the method of example 12, wherein each of the plurality of RB sets includes a physical sidelink control channel (PSCCH) candidate resource.

Example 14 is the method of any of examples 12 to 13, wherein the at least one contiguous set of RBs includes multiple, contiguous sets of RBs, and further comprising: transmitting a PSCCH in an initial RB set of the multiple, contiguous sets of RBs.

Example 15 is the method of any of examples 12 to 14, further comprising transmitting an interlaced PSCCH in the at least one contiguous set of RBs, wherein an interlace of the interlaced PSCCH is relative to an initial RB of the at least one contiguous set of RBs.

Example 16 is an apparatus for wireless communication, comprising a memory and at least one processor coupled to the memory and configured to receive sidelink (SL) data in at least one contiguous set of resource blocks (RBs) within a bandwidth part (BWP) of an unlicensed frequency band, the BWP including a plurality of RB sets, wherein the SL data is received in a waveform generated for at least one of the plurality of RB sets prior to a listen-before-talk (LBT) procedure indicating an availability of the at least one contiguous set of RBs for transmission of the SL data.

Example 17 is the apparatus of example 16, wherein each of the plurality of RB sets includes a physical sidelink control channel (PSCCH) candidate resource.

Example 18 is the apparatus of any of examples 16 to 17, wherein the at least one contiguous set of RBs includes multiple, contiguous sets of RBs, and the at least one processor is further configured to receive a PSCCH in an initial RB set of the multiple, contiguous sets of RBs.

Example 19 is the apparatus of any of examples 16 to 18, wherein the at least one processor is further configured to receive an interlaced PSCCH in the at least one contiguous set of RBs, wherein an interlace of the interlaced PSCCH is relative to an initial RB of the at least one contiguous set of RBs.

Example 20 is the apparatus of examples 16 to 19, wherein the at least one contiguous set of RBs includes multiple, contiguous sets of RBs, and the at least one processor is further configured to receive an interlaced PSCCH in one of the multiple, contiguous sets of RBs, wherein an interlace of the interlaced PSCCH omits RBs in a guard band between adjacent ones of the multiple, contiguous sets of RBs.

Example 21 is the apparatus of any of examples 16 to 20, wherein the at least one contiguous set of RBs includes multiple, contiguous sets of RBs, the SL data is received in a physical sidelink shared channel (PSSCH), and the PSSCH spans the multiple, contiguous sets of RBs.

Example 22 is the apparatus of example 21, wherein the at least one processor is further configured to receive an indication in sidelink control information (SCI) of a frequency domain resource assignment (FDRA) of the PSSCH spanning the multiple, contiguous sets of RBs, wherein the indication of the FDRA is irrespective of the plurality of RB sets from which the multiple, contiguous sets of RBs are based.

Example 23 is the apparatus of example 22, wherein the FDRA is relative to an initial RB in an initial RB set of the multiple, contiguous sets of RBs.

Example 24 is the apparatus of examples 21 to 23, wherein the PSSCH includes RBs within a guard band between adjacent ones of the multiple, contiguous sets of RBs.

Example 25 is the apparatus of any of examples 21 to 24, wherein the PSSCH is an interlaced PSSCH, and an interlace of the interlaced PSSCH is relative to an initial RB of an initial RB set of the multiple, contiguous sets of RBs.

Example 26 is the apparatus of any of examples 21 to 25, wherein the PSSCH is an interlaced PSSCH, and an interlace of the interlaced PSSCH is irrespective of the plurality of RB sets from which the multiple, contiguous sets of RBs are based.

Example 27 is a method of wireless communication at a sidelink entity, comprising receiving sidelink (SL) data in at least one contiguous set of resource blocks (RBs) within a bandwidth part (BWP) of an unlicensed frequency band, the BWP including a plurality of RB sets, wherein the SL data is received in a waveform generated for at least one of the plurality of RB sets prior to a listen-before-talk (LBT) procedure indicating an availability of the at least one contiguous set of RBs for transmission of the SL data.

Example 28 is the method of example 27, wherein each of the plurality of RB sets includes a physical sidelink control channel (PSCCH) candidate resource.

Example 29 is the method of any of examples 27 to 28, wherein the at least one contiguous set of RBs includes multiple, contiguous sets of RBs, and further comprising receiving a PSCCH in an initial RB set of the multiple, contiguous sets of RBs.

Example 30 is the method of any of examples 27 to 29, further comprising receiving an interlaced PSCCH in the at least one contiguous set of RBs, wherein an interlace of the interlaced PSCCH is relative to an initial RB of the at least one contiguous set of RBs.

What is claimed is:

1. An apparatus for wireless communication, comprising: a memory; and
    at least one processor coupled to the memory and configured to:
        generate a plurality of waveforms, each of the waveforms generated for a respective number of one or more contiguous resource block (RB) sets of a plurality of RB sets included in a bandwidth part (BWP) of an unlicensed frequency band, the plurality of waveforms generated prior to obtaining an indication of availability of at least one contiguous set of RBs in the plurality of RB sets for transmission of the SL sidelink (SL) data, the indication obtained from a listen-before-talk (LBT) procedure; and
        transmit the SL data in a selected waveform of the plurality of waveforms, the selected waveform corresponding to the at least one contiguous set of RBs that has been indicated as available by the LBT procedure.

2. The apparatus of claim 1, wherein each of the plurality of RB sets includes a physical sidelink control channel (PSCCH) candidate resource.

3. The apparatus of claim 2, wherein the at least one contiguous set of RBs includes multiple, contiguous RB sets, and the at least one processor is further configured to:
    transmit a PSCCH in an initial RB set of the multiple, contiguous RB sets.

4. The apparatus of claim 2, wherein the at least one processor is further configured to:
    transmit an interlaced PSCCH in the at least one contiguous set of RBs,
    wherein an interlace of the interlaced PSCCH is relative to an initial RB of the at least one contiguous set of RBs.

5. The apparatus of claim 2, wherein the at least one contiguous set of RBs includes multiple, contiguous RB sets, and the at least one processor is further configured to:
    transmit an interlaced PSCCH in one of the multiple, contiguous RB sets,
    wherein an interlace of the interlaced PSCCH omits RBs in a guard band between adjacent ones of the multiple, contiguous RB sets.

6. The apparatus of claim 1, wherein the at least one contiguous set of RBs includes multiple, contiguous RB sets, the SL data is transmitted in a physical sidelink shared channel (PSSCH), and the PSSCH spans the multiple, contiguous RB sets.

7. The apparatus of claim 6, wherein the at least one processor is further configured to:
    transmit an indication in sidelink control information (SCI) of a frequency domain resource assignment (FDRA) of the PSSCH spanning the multiple, contiguous RB sets, wherein the indication of the FDRA is irrespective of the plurality of RB sets from which the multiple, contiguous RB sets are based.

8. The apparatus of claim 7, wherein the FDRA is relative to an initial RB in an initial RB set of the multiple, contiguous RB sets.

9. The apparatus of claim 6, wherein the PSSCH includes RBs within a guard band between adjacent ones of the multiple, contiguous RB sets.

10. The apparatus of claim 6, wherein the PSSCH is an interlaced PSSCH, and an interlace of the interlaced PSSCH is relative to an initial RB of an initial RB set of the multiple, contiguous RB sets.

11. The apparatus of claim 6, wherein the PSSCH is an interlaced PSSCH, and an interlace of the interlaced PSSCH is irrespective of the plurality of RB sets from which the multiple, contiguous RB sets are based.

12. A method of wireless communication at a sidelink entity, comprising:
    generating a plurality of waveforms, each of the waveforms generated for a respective number of one or more contiguous resource block (RB) sets of a plurality of RB sets included in a bandwidth part (BWP) of an unlicensed frequency band, the plurality of waveforms generated prior to obtaining an indication of availability of at least one contiguous set of RBs in the plurality of RB sets for transmission of sidelink (SL) data, the indication obtained from a listen-before-talk (LBT) procedure; and
    transmitting the SL data in a selected waveform of the plurality of waveforms, the selected waveform corresponding to the at least one contiguous set of RBs that has been indicated as available by the LBT procedure.

13. The method of claim 12, wherein each of the plurality of RB sets includes a physical sidelink control channel (PSCCH) candidate resource.

14. The method of claim 13, wherein the at least one contiguous set of RBs includes multiple, contiguous RB sets, and further comprising:
    transmitting a PSCCH in an initial RB set of the multiple, contiguous RB sets.

15. The method of claim 13, further comprising:
    transmitting an interlaced PSCCH in the at least one contiguous set of RBs, wherein an interlace of the interlaced PSCCH is relative to an initial RB of the at least one contiguous set of RBs.

16. An apparatus for wireless communication, comprising:
    a memory; and
    at least one processor coupled to the memory and configured to:
        monitor a resource pool spanning a plurality of resource block (RB) sets in a bandwidth part (BWP) of an unlicensed frequency band; and
        receive sidelink (SL) data in a waveform corresponding to at least one contiguous set of RBs of the plurality of RB sets, the waveform being from a plurality of generated waveforms each having been generated for a respective number of one or more contiguous RB sets of the plurality of RB sets prior to an indication from a listen-before-talk (LBT) procedure of an availability of the at least one contiguous set of RBs for transmission of the SL data.

17. The apparatus of claim 16, wherein each of the plurality of RB sets includes a physical sidelink control channel (PSCCH) candidate resource.

18. The apparatus of claim 17, wherein the at least one contiguous set of RBs includes multiple, contiguous RB sets, and the at least one processor is further configured to:
    receive a PSCCH in an initial RB set of the multiple, contiguous RB sets.

19. The apparatus of claim 17, wherein the at least one processor is further configured to:

receive an interlaced PSCCH in the at least one contiguous set of RBs, wherein an interlace of the interlaced PSCCH is relative to an initial RB of the at least one contiguous set of RBs.

20. The apparatus of claim 17, wherein the at least one contiguous set of RBs includes multiple, contiguous RB sets, and the at least one processor is further configured to:

receive an interlaced PSCCH in one of the multiple, contiguous RB sets, wherein an interlace of the interlaced PSCCH omits RBs in a guard band between adjacent ones of the multiple, contiguous RB sets.

21. The apparatus of claim 16, wherein the at least one contiguous set of RBs includes multiple, contiguous RB sets, the SL data is received in a physical sidelink shared channel (PSSCH), and the PSSCH spans the multiple, contiguous RB sets.

22. The apparatus of claim 21, wherein the at least one processor is further configured to:

receive an indication in sidelink control information (SCI) of a frequency domain resource assignment (FDRA) of the PSSCH spanning the multiple, contiguous RB sets, wherein the indication of the FDRA is irrespective of the plurality of RB sets from which the multiple, contiguous RB sets are based.

23. The apparatus of claim 22, wherein the FDRA is relative to an initial RB in an initial RB set of the multiple, contiguous RB sets.

24. The apparatus of claim 21, wherein the PSSCH includes RBs within a guard band between adjacent ones of the multiple, contiguous RB sets.

25. The apparatus of claim 21, wherein the PSSCH is an interlaced PSSCH, and an interlace of the interlaced PSSCH is relative to an initial RB of an initial RB set of the multiple, contiguous RB sets.

26. The apparatus of claim 21, wherein the PSSCH is an interlaced PSSCH, and an interlace of the interlaced PSSCH is irrespective of the plurality of RB sets from which the multiple, contiguous RB sets are based.

27. A method of wireless communication at a sidelink entity, comprising:

monitoring a resource pool spanning a plurality of resource block (RB) sets in a bandwidth part (BWP) of an unlicensed frequency band; and receiving sidelink (SL) data in a waveform corresponding to at least one contiguous set of RBs of the plurality of RB sets, the waveform being from a plurality of generated waveforms each having been generated for a respective number of one or more contiguous RB sets of the plurality of RB sets prior to an indication from a listen-before-talk (LBT) procedure of an availability of the at least one contiguous set of RBs for transmission of the SL data.

28. The method of claim 27, wherein each of the plurality of RB sets includes a physical sidelink control channel (PSCCH) candidate resource.

29. The method of claim 28, wherein the at least one contiguous set of RBs includes multiple, contiguous RB sets, and further comprising:

receiving a PSCCH in an initial RB set of the multiple, contiguous RB sets.

30. The method of claim 28, further comprising:

receiving an interlaced PSCCH in the at least one contiguous set of RBs, wherein an interlace of the interlaced PSCCH is relative to an initial RB of the at least one contiguous set of RBs.

* * * * *